United States Patent [19]
Ryan

[11] Patent Number: 5,562,054
[45] Date of Patent: Oct. 8, 1996

[54] SEEDING MACHINERY

[75] Inventor: John W. Ryan, Bibra Lake, Australia

[73] Assignee: Ausplow Pty. Ltd., Bibra Lake, Australia

[21] Appl. No.: 382,436

[22] Filed: Feb. 2, 1995

[30] Foreign Application Priority Data

Feb. 3, 1994 [AU] Australia ................... PM3667

[51] Int. Cl.$^6$ ............... A01C 7/20; A01B 49/06
[52] U.S. Cl. .................. 111/134; 111/191; 111/186; 111/194; 111/136
[58] Field of Search ................... 111/134, 135, 111/136, 137, 186, 187, 188, 189, 190, 191, 192, 193, 194, 195

[56] References Cited

U.S. PATENT DOCUMENTS

| | | | |
|---|---|---|---|
| 322,841 | 7/1885 | Miskimen | 111/189 |
| 2,861,527 | 11/1958 | Phillips | 111/186 |
| 2,963,998 | 12/1960 | Bliss | 111/189 |
| 3,148,644 | 9/1964 | Keeton | 111/189 X |
| 3,673,970 | 7/1972 | Hatcher | 111/134 X |
| 3,773,224 | 11/1973 | Winslow | 111/186 X |
| 3,976,017 | 8/1976 | Leffler, Jr. | 111/134 X |
| 4,023,510 | 5/1977 | Sorlic et al. | 111/189 X |
| 4,043,281 | 8/1977 | Sorlic et al. | 111/189 X |
| 4,422,392 | 12/1983 | Dreyer et al. | 111/134 X |
| 4,762,075 | 8/1988 | Halford | 111/187 X |
| 4,766,962 | 8/1988 | Frase | 111/134 X |
| 4,895,086 | 1/1990 | Tye, III | 111/134 |
| 5,161,472 | 11/1992 | Handy | 111/187 X |
| 5,396,851 | 3/1995 | Beaujot | 111/187 |

*Primary Examiner*—Terry Lee Melius
*Assistant Examiner*—Victor Batson
*Attorney, Agent, or Firm*—Ladas & Parry

[57] ABSTRACT

A seeding assembly (20) for attachment to a cultivating or seeding tine (21). The seeding assembly (20) includes a seed tube (52) movably attached to the tine (21) by parallel linkages (53, 54). A wheel (63) is attached to the seeding tube (52) to regulate the height of the lower extremity (53) of the seeding tube (52) so that a seed is delivered to a seed bed (54) prepared by a closing tool (58) located forward of the seed tube (52).

10 Claims, 5 Drawing Sheets

SEEDING MACHINERY

TECHNICAL FIELD

The present invention relates to seeding machinery and more particularly but not exclusively to seeding machinery for attachment to a seeding or cultivating tine.

BACKGROUND OF THE INVENTION

It has been found in practice that tined seeding machinery and attachments have difficulty in penetrating soil deeply whilst at the same time maintaining accurate placement of seed and fertilizer. Due to the undulating ground conditions nearly always encountered, and with seeding depth controlled by widely spaced ground wheels, seeding depth cannot be maintained, often with seed and fertilizer placed together on a hard impenetrable barrier causing poor seed germination, loss of plant vigor, low yields, poor water infiltration, waterlogging and fertilizer toxicity and a greater incidence of disease.

OBJECT OF THE INVENTION

It is the object of the present invention to overcome or substantially ameliorate the above disadvantages.

SUMMARY OF THE INVENTION

There is disclosed herein a seeding assembly to be used with a plough frame supporting at least one plough tine, said assembly comprising:

a seeding tube to extend downwardly into a slot formed in a soil layer by the tine, said tube having a lower extremity through which seed is delivered into the soil layer;

a closing tool fixed with respect to said lower extremity and having a leading surface forward thereof relative to the normal direction of travel of the frame over the soil layer, said closing tool being aligned in said direction with respect to said lower extremity so that it engages soil adjacent said slot to partly close the slot and provide a seed bed onto which seed leaving said lower extremity is delivered;

mounting means to attach the tube and closing tool to the frame to permit height adjustment of the tube and the closing tool with respect to the frame; and ground engaging means operatively associated with the tube and closing tool to engage the soil layer to cause said height adjustment.

Preferably, the mounting means attaches the tube, closing tool and ground engaging means to the rear of the tine.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
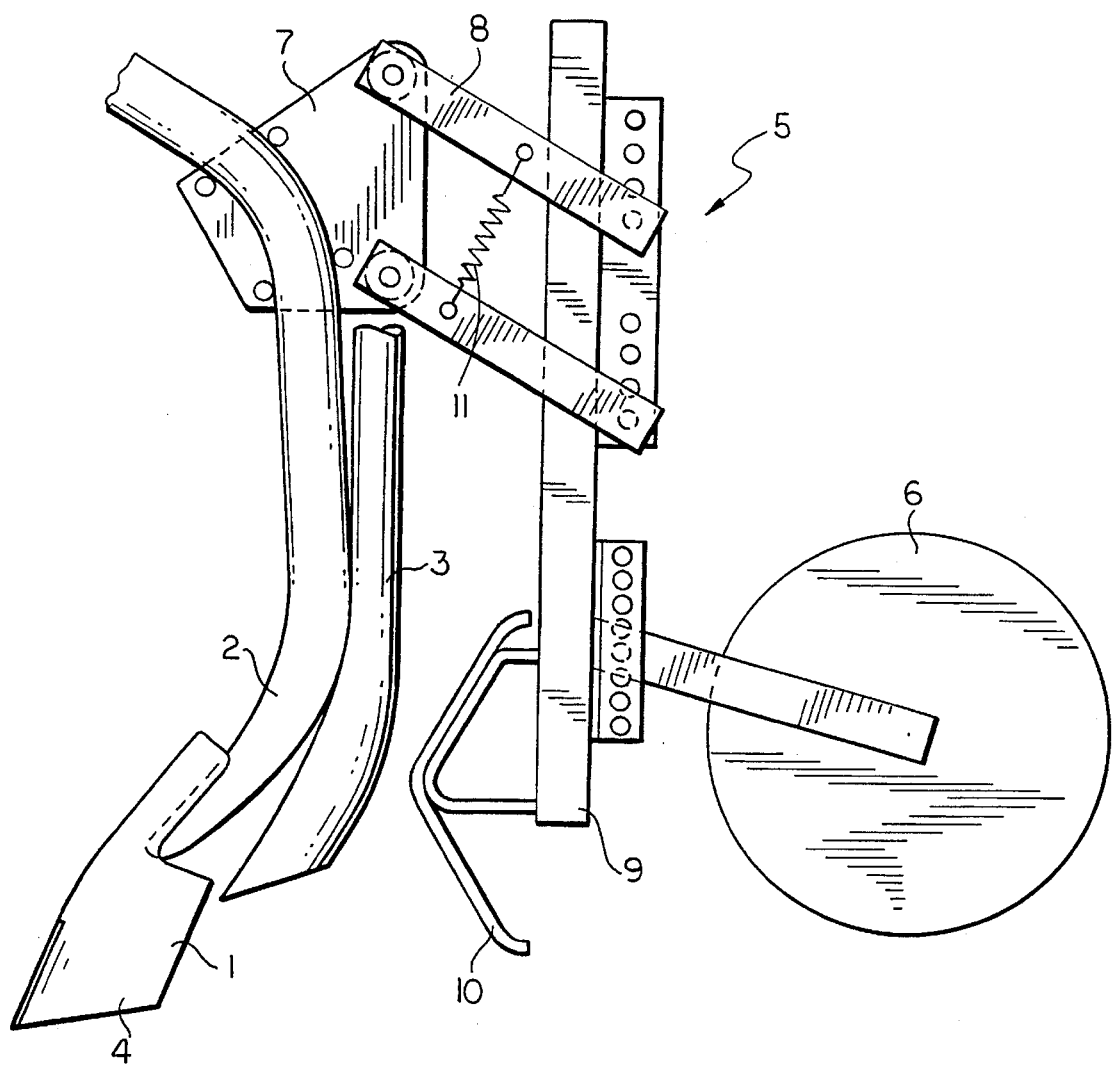
FIG. 1 is a schematic side elevation of a seeding or cultivating tine in combination with a seeding assembly.
Figure 2:
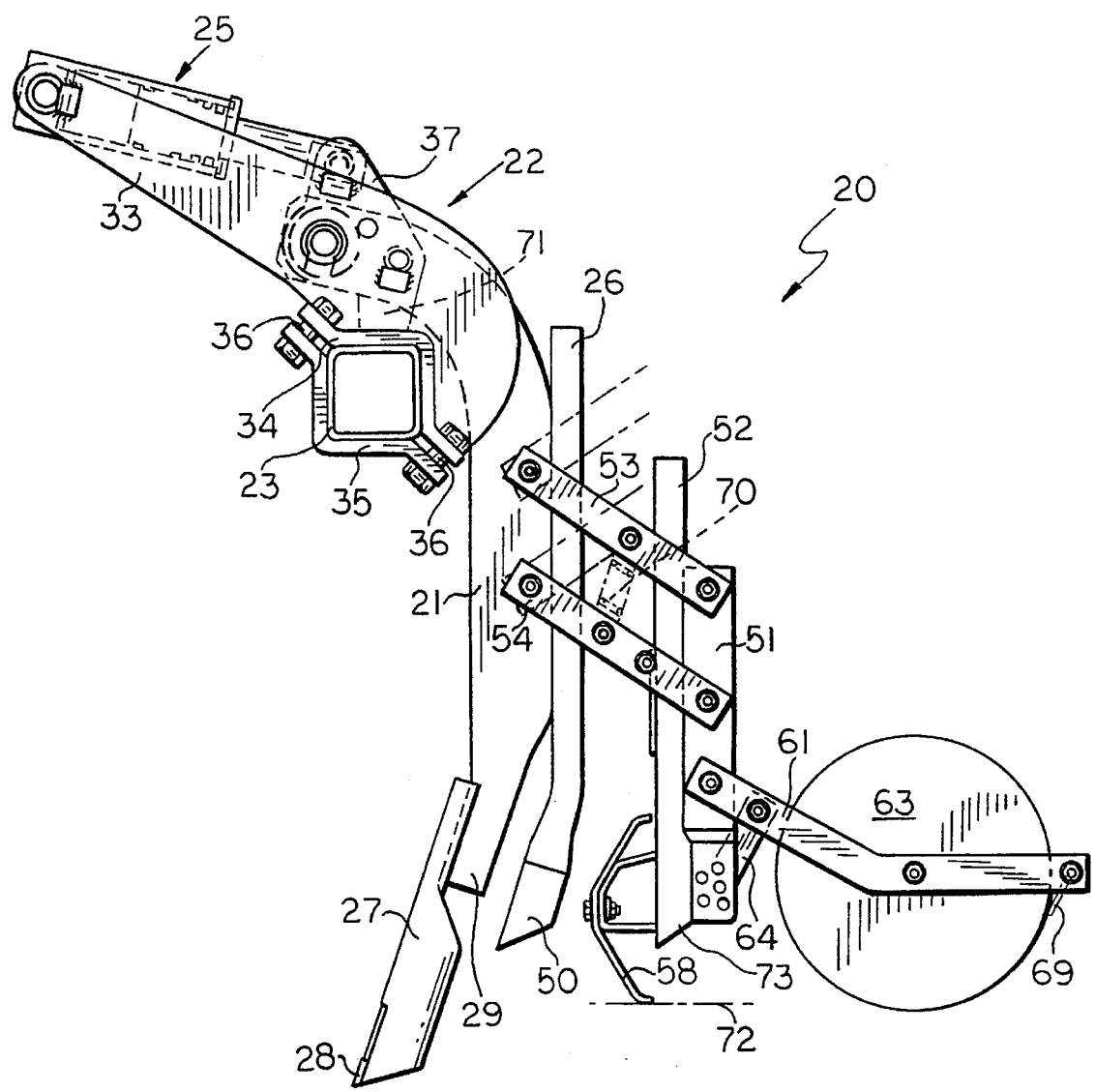
FIG. 2 is a schematic side elevation of a further cultivating or seeding tine in combination with a seeding assembly.
Figure 4:
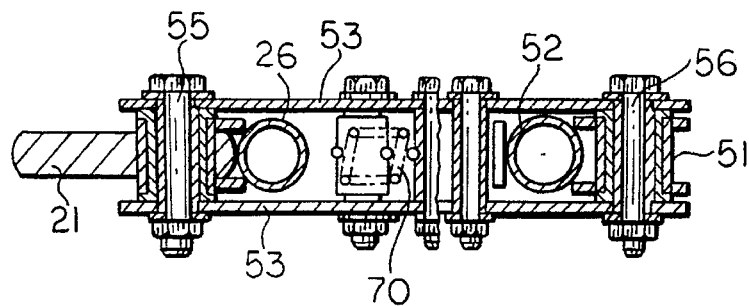
FIG. 4 is a schematic sectioned plan view of the seeding assembly of FIG. 3 sectioned along the line 4—4.
Figure 5:
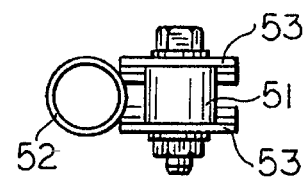
FIG. 5 is a schematic top plan view of a portion of the seeding assembly of FIG. 3.
Figure 3:
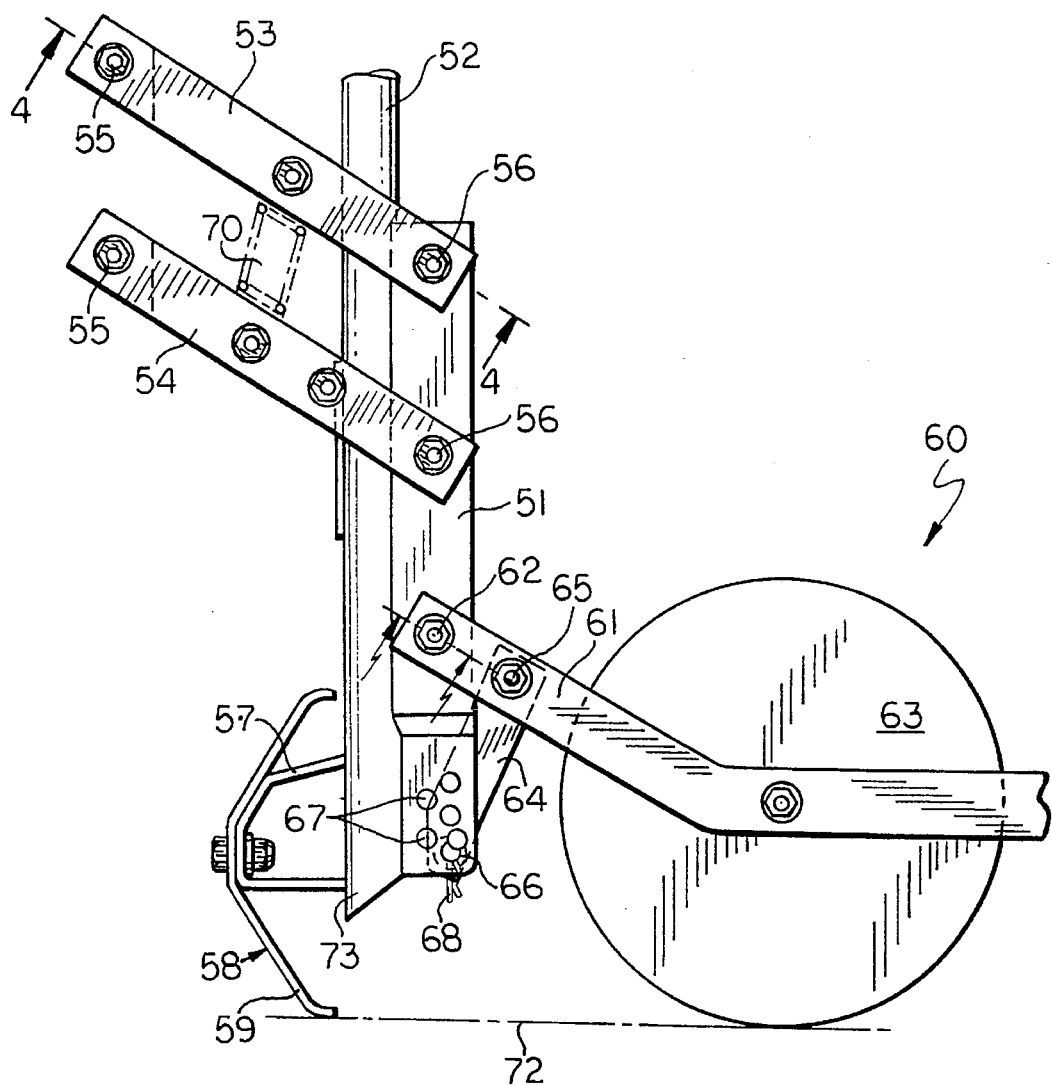
FIG. 3 is a schematic side elevation of the seeding assembly of FIG. 1.

The first embodiment of the invention will be described with reference to FIG. 1.

It has been found that by attaching a deep digging blade 1 approximately 13 mm wide to the end of a standard seeding or cultivator tine 2 allows penetration of the soil to a depth of at least 100–130 mm (and preferably deeper) a slot is created, loosening the soil and allowing deep placement of fertilizer through a down-pipe 3 attached to the rear of the tine. An optional small low angle lifting plate 4 approximately 6°–8° to the horizontal attached to the bottom of the digging blade can enhance the loosening effect and provide greater soil aeration.

Directly behind this tine 1 a ground following seeding mechanism 5 and press wheel 6 is attached.

A mounting bracket 7 is clamped to the front tine 2 and a parallelogram linkage 8 is pivotally attached and a seed/fertilizer pipe 9 attached on the other end of the linkage 8.

At the bottom of the pipe, a slot closing plate 10 is attached. This plate 10 is flat faced approximately 30 mm wide and in operation is drawn over the loosened soil closing the slot made by the blade tool 1, consolidating a seed bed whilst controlling the placement of seed at the correct depth.

Behind this slot closing plate 10 a wheel 6 is attached to the seed pipe 9, adjustment is provided enabling seed depth to be selected and maintained by the ground following characteristics of the parallelogram linkage mechanism 8 with a downward pressure provided from a tension spring 11 operating between the parallelogram linkages 8. Pressure can be increased or decreased by adjustment provided, or by changing to a lighter or heavier spring 11.

This wheel 6 provides the means for ground following characteristics of the closing tool 10 and with downward pressure applied by the tension spring 11 firms soil around seed. It has a face width of approximately 50 mm and the wheel face is flat.

The flat or leading edge of the deep digging blade 1 13 mm wide followed by the closing tool 10 30 mm wide and finally the wheel 6 50 mm wide causes firstly opening a deep slot with minimum surface disturbance and reduced kw requirements.

The second tool causes collapsing of this slot to create a seed bed and thirdly with the wheel following, the flat face causes soil to collapse inwards covering the seed whilst providing downward pressure firming soil around the seed.

Steps two and three are performed under the influence of the ground following characteristics of the linkage mechanism.

With each of these three distinct functions performed using flat faced components whilst travelling in a forward direction an increase or decrease in operating speeds have little or no effect of the efficiency of each function and importantly, sideways movement or spraying soil over adjacent surfaces is almost completely eliminated and thus reduces adjacent weed germination or pasture set-back.

The above method of loosening and placement of fertilizer and seed can be further improved by positioning a straight coulter disc ahead and in line, cutting surface trash and plant rots allowing a clean deep slot to be made.

The second embodiment of the present invention is shown in FIGS. 2 to 9. In these figures there is schematically depicted a seeding assembly 20 mounted on the rear of a cultivating or seeding tine 21. The tine 21 is pivotally mounted via pivot assembly 22 on a plough frame including a generally horizontal beam 23 which would extend generally transverse of the general direction of movement of the plough frame over a soil surface 24. The tine 21 is biased to the position depicted in FIGS. 2 and 6 by means of an hydraulic or pneumatic ram 25.

Also attached to the rear of the tine 21 is a fertilizer tube 26, while attached to the lower end of the tine 21 is a digging blade 27. The blade 27 is provided with a tungsten carbide top 28. The leading surface of the blade 27 is inclined to the vertical by 15°–25°, preferably 20°.

The tine 21 has a lower portion 29 through which bolts 30 pass to secure the upper end 31 to the blade 27. The tine 21 has an upper arcuate portion 32 which extends to the pivot assembly 22. The pivot assembly 22 is generally mounted between a pair of flanges 33 welded to a bracket 34. The bracket 34 cooperates with a further bracket 35 and bolts 36 to secure the flanges 33 to the beam 23. The flanges 33 are generally parallel and coextensive and generally normal to the longitudinal axis of the beam 23.

The pivot assembly 22 also cooperates with a pair of flanges 37 which couple the ram 25 to the tine 21.

A pivot pin 38 extends through the flanges 33, 37 and tine 21. The pivot pin 38 is prevented from rotation by means of a key 39 engaging a flat face of the pin 38. A pin 40 passes through the flanges 37 and tine 21 to ensure that they pivot about the pin 38 in unison. The pin 40 is prevented from rotation by means of a key 41. A lock pin 42 ensures that the bush 43 pivots with the flanges 37 and tine 21 about the pin 38.

The ram 25 includes a cylinder 44 which receives a piston 45 from which there extends a piston rod 46. The piston rod 46 is pivotally attached to the flanges 37 by means of a pin 47. The cylinder 44 is pivotally attached to the flanges 35 by means of a pin 48.

Figure 6:
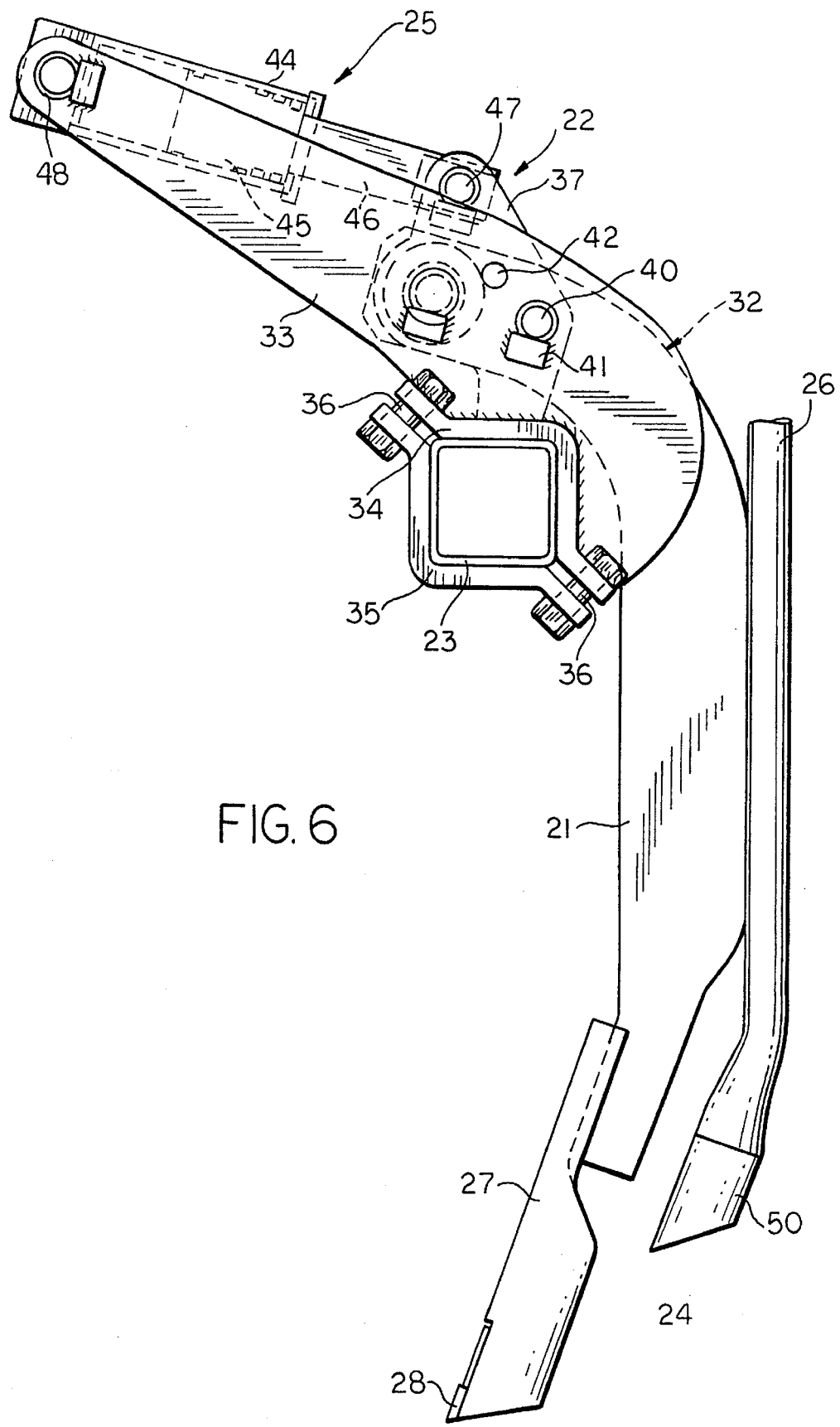
FIG. 6 is a schematic side elevation of the tine, jump mechanism and frame illustrated in FIG. 2.
Figure 7:
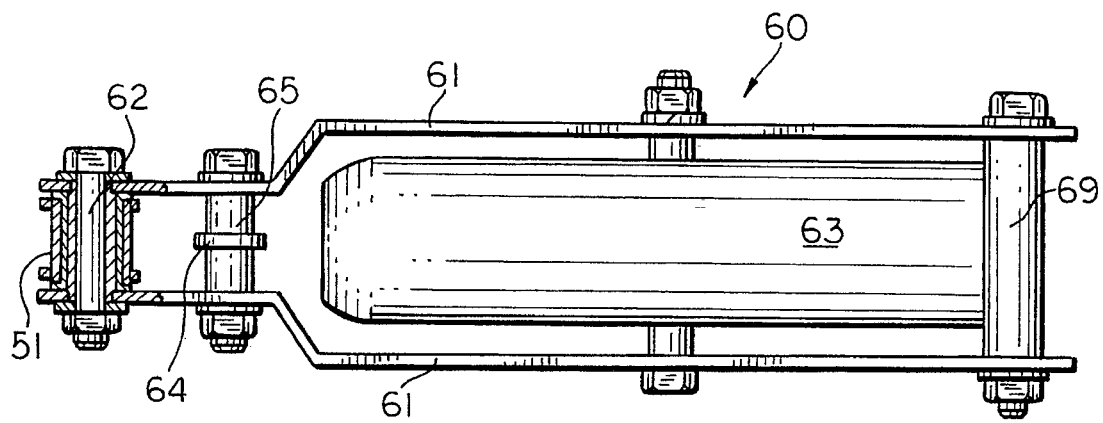
FIG. 7 is a schematic part sectioned plan view of the wheel employed in FIG. 2, sectioned along the line 7—7.
Figure 8:
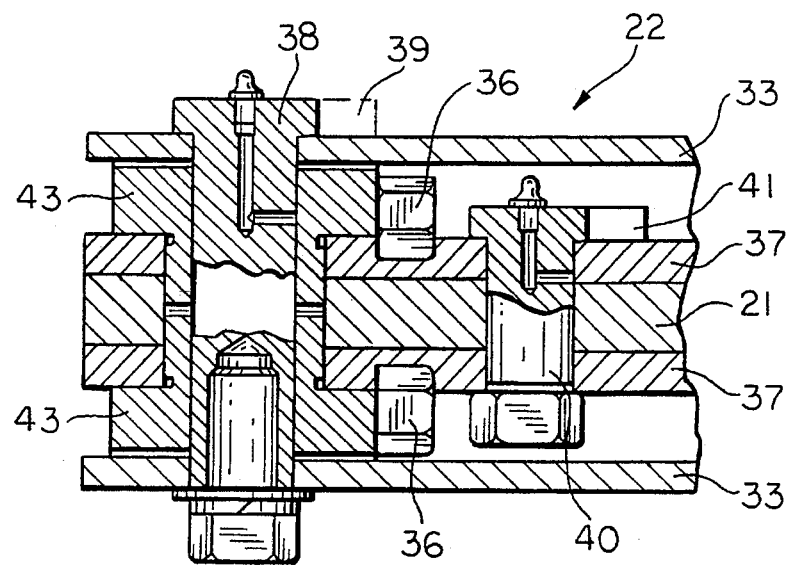
FIG. 8 is a schematic sectioned plan view through the central pivot assembly the tine of FIG. 6.
Figure 9:
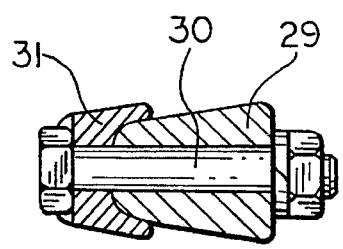
FIG. 9 is a schematic sectioned plan view of a lower portion of the tine of FIG. 6.

Air or hydraulic fluid under pressure is delivered to the cylinder 44 to cause the piston rod 46 to apply a force to the flanges 37 to thereby bias the tine 21 to move clockwise (as viewed in FIG. 6) to the position shown in FIG. 6. If an obstacle is encountered by the tine 21 or blade 27, the tine 21 will pivot anti-clockwise, overcoming the force applied by the ram 25, until the obstacle is overcome. The tine 21 then pivots clockwise to reposition the blade 27 to the position as illustrated in FIG. 6. In this regard it should be appreciated that the blade 27 is displaced slightly rearwardly from the longitudinal axis of the pivot pin 38 during normal use. The position shown in FIG. 6 is determined by abutment of the lower portions 71 of the flanges 37, on the bracket 34.

The fertilizer tube 26 has a lower extremity 50 through which fertilizer is delivered to a slot formed in the soil layer 24 by the blade 27.

The seeding assembly 20 includes a centre bracket 51 to which there is fixed a seeding tube 52 having a lower end 73 through which seed is delivered to a prepared seed bed 72. Pivotally attached to the centre bracket 51 is a parallelogram mechanism including two pairs of parallel linkages 53 and 54. The forward end of the linkages 53 and 54 are pivotally attached to the tine 21 by means of pivot pins 55. The rear portions of the linkages 53 and 54 are pivotally attached to the centre bracket 51 by pivot pin 56.

Mounted on the tube 52 by means of a bracket 57, is a closing tool 58. The closing tool 58 has a leading surface 59 which engages the soil adjacent the slot formed by the blade 27, to partially close the slot and to form the seed bed 72. The surface 59 is located forward of the lower end 73. In this regard it should be appreciated that the lower extremities of the closing tool 58 are located higher than the lower portions of the blade 27 so that the fertilizer is located at a distance displaced below the seed bed 72.

The seeding assembly 20 includes a wheel assembly 60 having a pair of trailing arms 61 having their forward ends pivotally attached to the centre bracket 51 by means of a pivot pin 62. The wheel assembly 60 includes a wheel 63 which preferably has a rubber outer surface, and may be inflatable. One or more braces 64 extend between the trailing arms 61 and the centre bracket 52 to locate the wheel 63 at the desired height relative to the seed bed 72. Preferably, the lower portions of the wheel 63 are displaced higher than the seed bed 72. The wheel 53 engages portions of the soil layer surrounding the slot, to cause the soil to collapse inwardly with respect to the slot to cover the seed and seed bed 72. The wheel 53 may also slightly compact the soil.

The brace or braces 64 are pivotally attached to the trailing arms 61 by means of a pivot pin 65. A pin 66 then passes through an aperture in the brace 64 and a selected one of the apertures 67 in the center bracket 51 in order to set the height of the wheel 63. The height of the wheel 63 can be adjusted by selecting an alternative aperture 67. A split pin 68 holds the pin 66 in position.

Attached to the rear of the trailing arms 61 is a cleaning blade 69 resiliently biased into contact with the outer surface of the wheel 63 to clean the wheel 63.

A tensioned spring 70 extends between the pairs of linkages 53 and 54 to increase the force applied to the soil layer 21 by the wheel 63. The greater the tension force applied to the spring 70, the greater the force applied by the wheel 63. The positions at which the spring 70 is attached to the linkages 53 and 54 may be varied to increase or decrease the tension in the spring 70.

As the linkages 53 and 54 are pivotally attached to the tine 21 and center bracket 51, the operative height of the seeding assembly 20 is adjusted by the wheel 63 passing over the ground surface. This thereby ensures that the seed is delivered to a desired depth irrespective of variations in the soil surface.

The blade 27 is narrower than the closing tool 58, which in turn is narrower than the width of the wheel 63 where it engages the soil. This in combination with the relative heights of the blade 27, the closing tool 58, and the wheel 63, creates a strataed effect in the soil in that the fertilizer is located at a depth spaced below the seed bed 72, while in turn the seed bed 72 is displaced below the actual soil level over which the wheel 63 passes. It should further be appreciated that the depth of the seed bed 72 is adjusted so that it is at a desired depth below the soil surface over which the wheel 63 passes.

It should be appreciated that the closing tool 58, seeding tube 52 and wheel 63 could be laterally displaced from an aligned position behind the blade 27.

In addition to the above, the parallelogram linkages 53 and 54 could be replaced with a pivoting arm.

What I claim is:

1. A seeding assembly to be used with a plough frame supporting at least one plough tine, said assembly comprising:

a seeding tube to extend downwardly into a slot formed in a soil layer by the tine, said tube having a lower extremity through which seed is delivered into the soil layer;

a closing tool fixed with respect to said lower extremity and having a leading surface forward thereof relative to the normal direction of travel of the frame over the soil layer, said closing tool being aligned in said direction with respect to said lower extremity and being configured so that it engages soil adjacent said slot to partly close the slot and provide a seed bed onto which seed leaving said lower extremity is delivered;

mounting means to attach the tube and closing tool to the frame to permit height adjustment of the tube and the closing tool with respect to the frame; and ground engaging means operatively associated with the tube and closing tool to engage the soil layer to cause said height adjustment.

2. The seeding assembly of claim 1, wherein said ground engaging means is a wheel, and said assembly further includes at least one trailing arm attached to said seeding tube.

3. The seeding assembly of claim 2, wherein said trailing arm is pivotally attached to said seeding tube, and said assembly further includes adjustable means to fix the height of said wheel with respect to the seeding tube.

4. The seeding assembly of claim 3, wherein said adjustable means is a brace which operatively extends between said trailing arm and the seeding tube.

5. The seeding assembly of claim 4, further including a center bracket fixed to said tube, and to which said trailing arm and brace are attached to thereby be attached to said seeding tube.

6. The seeding assembly of claim 1, wherein said mounting means includes a parallelogram mechanism, said mechanism including at least two parallel links having adjacent ends pivotally attached to the seeding tube and extending forward therefrom for pivoting attachment to the plough frame.

7. The seeding assembly of claim 1, wherein said mounting means is adapted to be attached to the tine in order to be attached to the frame.

8. In combination, a plough tine having attached to its lower extremity a digging blade, a fertilizer tube and the seeding assembly of claim 1, wherein the digging blade, fertilizer tube, closing tool, seeding tube and ground engaging means are aligned in that order in the intended direction of travel.

9. The combination of claim 8, wherein said digging blade, fertilizer tube, closing tool, seeding tube and ground engaging means each have lower extremities, with the lower extremity of said fertilizer tube being displaced higher than the the lower extremity of said digging blade, the lower extremity of said closing tool is located at a position higher than the lower extremity of said digging blade, and the lower extremity of said ground engaging means is locatable at a position higher than the lower extremity of said closing tool.

10. The combination of claim 8, wherein said digging blade, closing tool and ground engaging means each have an operative width, with the operative width of said digging blade being narrower than the operative width of said closing tool, and the operative width of said closing tool is narrower than the operative width of said ground engaging means.

* * * * *

REEXAMINATION CERTIFICATE (4122nd)

United States Patent  [19]
Ryan

[11] B1 5,562,054
[45] Certificate Issued: Jul. 18, 2000

[54] SEEDING MACHINERY

[75] Inventor: John W. Ryan, Bibra Lake, Australia

[73] Assignee: Ausplow Pty. Ltd., Bibra Lake, Australia

Reexamination Request:
  No. 90/004,630, May 12, 1997

Reexamination Certificate for:
  Patent No.:  5,562,054
  Issued:      Oct. 8, 1996
  Appl. No.:   08/382,436
  Filed:       Feb. 2, 1995

[30]  Foreign Application Priority Data

Feb. 3, 1994 [AU] Australia .................. PM3667

[51] Int. Cl.⁷ ............... A01C 5/00; A01B 49/04
[52] U.S. Cl. ............ 111/134; 111/191; 111/186; 111/194; 111/136
[58] Field of Search ................ 111/134, 135, 111/136, 137, 186–195

[56]  References Cited

U.S. PATENT DOCUMENTS 2,159,652   5/1939   Brunner .
  2,704,524   3/1955   McIntyre ................. 111/194 X
  4,520,742   6/1985   Anderson .
  4,565,141   1/1986   Kopecky .
  4,607,581   8/1986   Kopecky .
  4,691,645   9/1987   Anderson .
  4,726,304   2/1988   Dreyer et al. .
  4,798,151   1/1989   Rodrigues, Jr. et al. .
  4,926,767   5/1990   Thomas .
  5,161,472  11/1992   Handy .

FOREIGN PATENT DOCUMENTS 581581   5/1986   Australia .
  618542   7/1988   Australia .

*Primary Examiner*—Victor Batson

[57]  ABSTRACT

A seeding assembly (20) for attachment to a cultivating or seeding tine (21). The seeding assembly (20) includes a seed tube (52) movably attached to the tine (21) by parallel linkages (53, 54). A wheel (63) is attached to the seeding tube (52) to regulate the height of the lower extremity (53) of the seeding tube (52) so that a seed is delivered to a seed bed (54) prepared by a closing tool (58) located forward of the seed tube (52).

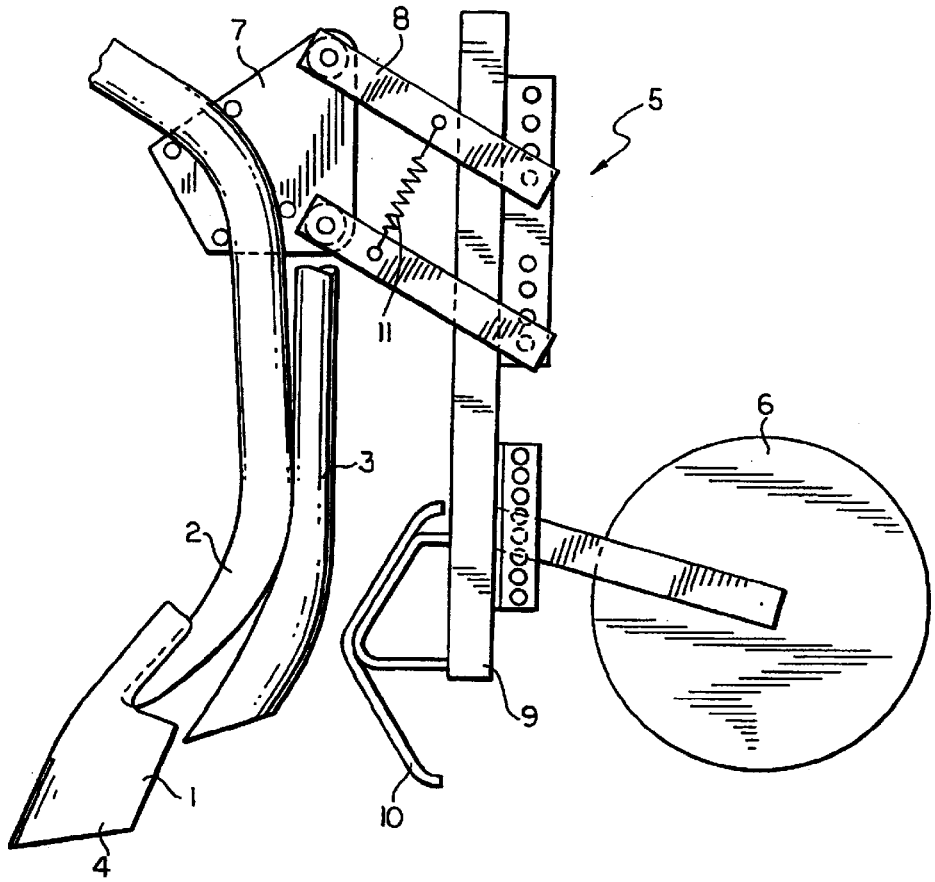

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 29–50:

There is disclosed herein a seeding assembly to be used with a plough frame supporting at least one plough tine, said assembly comprising:

a seeding tube to extend downwardly into a slot formed in a soil layer by the tine, said tube having a lower extremity through which seed is delivered into the soil layer;

a closing tool fixed with respect to said lower extremity and having a leading surface forward thereof relative to the normal direction of travel of the frame over the soil layer, said closing tool being aligned in said direction with respect to said lower extremity so that it engages soil adjacent said slot to partly close the slot and provide a seed bed onto which seed leaving said lower extremity is delivered;

mounting means to attach the tube and closing tool to the frame to permit height adjustment of the tube and the closing tool with respect to the frame *and tine*; and ground engaging means operatively associated with the tube and closing tool to engage the soil layer to cause said height adjustment.

Column 4, lines 8–16:

Mounted on the tube 52 by means of a bracket 57, is a closing tool 58 *which is fixed to the lower extremity of the tube 52 in a fixed orientation*. The closing tool 58 has a leading surface 59 which engages the soil adjacent the slot formed by the blade 27, to partially close the slot and to form the seed bed 72. The surface 59 is located forward of the lower end 73. In this regard it should be appreciated that the lower extremities of the closing tool 58 are located higher than the lower portions of the blade 27 so that the fertilizer is located at a distance displaced below the seed bed 72.

Column 4, lines 47–53:

As the linkages 53 and 54 are pivotally attached to the tine 21 and center bracket 51, the operative height of the seeding assembly 20 is adjusted by the wheel 63 passing over the ground surface. This thereby ensures that the seed is delivered to a desired depth irrespective of variations in the soil surface. *The parallelogram mechanisms maintain the orientation of the closing tool and seeding tube during height adjustment of the seeding assembly relative to the plough frame and plough tine.*

AS A RESULT OF REEXAMINATION, IT HAS BEEN DETERMINED THAT:

Claims 1–3 and 8 are determined to be patentable as amended.

Claims 4–7, 9 and 10, dependent on an amended claim, are determined to be patentable.

New claims 11–24 are added and determined to be patentable.

1. A seeding assembly to be used with a plough frame supporting at least one plough tine, said assembly comprising:

a seeding tube to extend downwardly into a slot formed in a soil layer by the tine, said tube having a lower extremity through which seed is delivered into the soil layer;

a closing tool fixed with respect to said lower extremity and having a leading surface forward thereof relative to the normal direction of travel of the frame over the soil layer, said closing tool being aligned in said direction with respect to said lower extremity and being configured so that it engages soil adjacent said slot *to dislodge the soil* to partly close the slot and provide a seed bed onto which seed leaving said lower extremity is delivered;

*first* mounting means to attach the tube and closing tool to the frame to permit height adjustment of the tube and the closing tool with respect to the frame; and ground engaging means operatively associated with the tube and closing tool to engage the soil layer to cause said height adjustment; *and*

*second adjustable mounting means for adjustably attaching the ground engaging means to the tube and closing tool thereby to enable said ground engaging means to effect said height adjustment.*

2. The seeding assembly of claim 1, wherein said ground engaging means is a wheel, and said assembly further includes at least one trailing arm attached to said seeding tube *and supported by said wheel*.

3. The seeding assembly of claim 2, wherein said trailing arm is pivotally attached to said seeding tube, and said assembly further includes adjustable means to fix the height of said wheel with respect to the seeding tube *by permitting pivoting of said trailing arm relative to said tube*.

8. In combination, a plough tine having attached to [its lower extremity a digging blade,] *it* a fertilizer tube and the seeding assembly of claim 1, *as well as a digging blade attached to a lower extremity of the tine,*wherein the digging blade, fertilizer tube, closing tool, seeding tube and ground engaging means are aligned in that order in the intended direction of travel.

11. The combination of claim 8 wherein the seeding assembly is directly attached to the tine, so as to be movable relative thereto to provide said height adjustment.

12. A plough including a frame and the combination of claim 11, wherein said combination is attached to the frame for relative movement with respect thereto when an obstacle is encountered.

13. A seeding assembly to be used with a plough frame supporting at least one plough tine, said assembly comprising:

a seeding tube to extend downwardly into a slot formed in a soil layer by the tine, said tube having a lower extremity through which seed is delivered into the soil layer;

a closing tool fixed with respect to said lower extremity and having a leading surface forward thereof relative to the normal direction of travel of the frame over the soil layer, said closing tool being aligned in said direction with respect to said lower extremity and being configured so that it engages soil adjacent said slot to dislodge the soil to partly close the slot and provide a seed bed onto which seed leaving said lower extremity is delivered;

mounting means to attach the tube and closing tool to the frame to permit height adjustment of the tube and the closing tool with respect to the frame and tine;

ground engaging means, comprising a wheel behind said seeding tube, operatively associated with the tube and closing tool to engage the soil layer to cause said height adjustment, with the closing tool having an operative width that is narrower than an operative ground engaging width of said wheel to cause soil to collapse over said seed bed; and wherein the seeding tube, closing tool and wheel are aligned in the normal direction of travel of the assembly.

14. The seeding assembly of claim 13, wherein said assembly further includes at least one trailing arm attached to said seeding tube and supported by said wheel.

15. The seeding assembly of claim 14, wherein said trailing arm is pivotally attached to said seeding tube, and said assembly further includes adjustable means to fix the height of said wheel with respect to the seeding tube by permitting pivoting of said trailing arm relative to said tube.

16. The seeding assembly of claim 15, wherein said adjustable means is a brace which operatively extends between said trailing arm and the seeding tube.

17. The seeding assembly of claim 16, further including a center bracket fixed to said tube, and to which said trailing arm and brace are attached to thereby be attached to said seeding tube.

18. The seeding assembly of claim 13, wherein said mounting means includes a parallelogram mechanism, said mechanism including at least two parallel links having adjacent ends pivotally attached to the seeding tube and extending forward therefrom for pivoting attachment to the plough frame.

19. The seeding assembly of claim 13, wherein said mounting means is adapted to be attached to the tine in order to be attached to the frame.

20. In combination a plough tine having attached to it a fertilizer tube and the seeding assembly of claim 13, as well as a digging blade attached to a lower extremity of the tine, wherein the digging blade, fertilizer tube, closing tool, seeding tube and ground engaging means are aligned in that order in the intended direction of travel.

21. The combination of claim 20, wherein said digging blade, fertilizer tube, closing tool, seeding tube and ground engaging means each have lower extremities, with the lower extremity of said fertilizer tube being displaced higher than the lower extremity of said digging blade, the lower extremity of said closing tool is located at a position higher than the lower extremity of said digging blade, and the lower extremity of said ground engaging means is locatable at a position higher than the lower extremity of said closing tool.

22. The combination of claim 20, wherein said digging blade, closing tool and ground engaging means each have an operative width, with the operative width of said digging blade being narrower than the operative width of said closing tool, and the operative width of said closing tool is narrower than the operative width of said ground engaging means.

23. The combination of claim 20, wherein the seeding assembly is directly attached to the tine, so as to be movable relative thereto to provide said height adjustment.

24. A plough including a frame and the combination of claim 20, wherein said combination is attached to the frame for relative movement with respect thereto when an obstacle is encountered.

* * * * *